(12) United States Patent
Wang

(10) Patent No.: US 11,471,811 B2
(45) Date of Patent: Oct. 18, 2022

(54) ACTIVATED CARBON AIR FILTER

(71) Applicant: Focus Universal Inc., Ontario (CA)

(72) Inventor: Desheng Wang, Diamond Bar, CA (US)

(73) Assignee: Focus Universal Inc., Ontario (CA)

( * ) Notice: Subject to any disclaimer, the term of this patent is extended or adjusted under 35 U.S.C. 154(b) by 161 days.

(21) Appl. No.: 16/710,359

(22) Filed: Dec. 11, 2019

(65) Prior Publication Data
US 2021/0178308 A1 Jun. 17, 2021

(51) Int. Cl.
| | | |
|---|---|---|
| *B01D 46/24* | (2006.01) | |
| *B01D 46/00* | (2022.01) | |
| *B01D 46/10* | (2006.01) | |
| *B01D 50/20* | (2022.01) | |

(52) U.S. Cl.
CPC ....... *B01D 46/2486* (2021.08); *B01D 46/106* (2013.01); *B01D 46/2478* (2021.08); *B01D 50/20* (2022.01); *B01D 46/2496* (2021.08); *B01D 2201/62* (2013.01); *B01D 2253/102* (2013.01); *B01D 2258/06* (2013.01); *B01D 2271/02* (2013.01)

(58) Field of Classification Search
CPC ............ B01D 46/0001; B01D 46/0036; B01D 46/106; B01D 46/2486; B01D 46/2496; B01D 46/2411; B01D 46/2422; B01D 46/2455; B01D 46/2418; B01D 46/2478; B01D 46/2451; B01D 50/20; B01D 2201/62; B01D 2253/102; B01D 2258/06; B01D 2271/02
See application file for complete search history.

(56) References Cited

U.S. PATENT DOCUMENTS

| | | | | |
|---|---|---|---|---|
| 4,419,108 | A * | 12/1983 | Frost ................. | B01D 46/2422 95/286 |
| 6,097,011 | A * | 8/2000 | Gadkaree ........... | B01J 20/28045 428/116 |
| 2004/0081848 | A1* | 4/2004 | Hijikata ................ | F01N 3/2825 428/593 |
| 2011/0229684 | A1* | 9/2011 | Naruse ............... | B01D 46/2474 428/116 |

* cited by examiner

*Primary Examiner* — Gabriel E Gitman
(74) *Attorney, Agent, or Firm* — Knobbe, Martens, Olson & Bear, LLP

(57) ABSTRACT

Disclosed is an air filter and a method of manufacture for an air filter which is much more cost effective and provides greater operational effectiveness than state-of-the-art air filters. The air filter includes an outer metallic shell which may be used to attach the filter in line to ducting of a heating, ventilation, and air conditioning (HVAC) system. The filter may further include a filter unit made of activated carbon material. The filter unit may have one or more sections and may have a honeycomb cross section.

8 Claims, 5 Drawing Sheets

ACTIVATED CARBON AIR FILTER

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Field

The present invention relates to an air filter for heating, ventilation, and air conditioning (HVAC) systems, and more specifically, an in line activated carbon air filter for HVAC system.

2. Background

In the state of the art, activated carbon HVAC filters pass air through a packed layer of granulated activated carbon. Naturally, the air flow takes the path of least resistance through the granulated carbon. This means that a typical filter will only use only a portion of the carbon before the filter no longer provides filtering effects. Because the air flow follows the path of least resistance, it will continue to flow where the activated carbon has absorbed all it can absorb. More likely, if not closely monitored, the inundated carbon will become even less resistive to the air flow. Thus, a certain portion of the carbon filter material never receives any airflow, and the filter material in this portion of the filter is wasted. Because of the granulated and, therefore, inherently non-uniform nature of the material, there is no way to guarantee an evenly-distributed flow of air over the active carbon filter material.

To better understand the air flow through a state-of-the-art filter, the structure of such a filter will now be described in reference to FIG. 1. The state-of-the-art filters 100 are generally cylindrically shaped. The HVAC filters include a metal, typically aluminum, frame 102 including an interior cylindrical mesh wall 104 and an exterior cylindrical mesh wall 106 spaced apart from one another, the inner wall having a smaller diameter than the outer wall, and the gap filled with granulated activated carbon. At a first end 108, a first cap attaches to the outer wall 106 and the inner wall 104, the first cap 107 further including a first solid portion located between a first end of the outer wall 106 and a first end of the inner wall 104. This first solid portion prevents any of the granulated active carbon material from escaping the space between the outer and inner walls 106, 104. The filter 100 further includes a second cap 110 which it attached to a second end of the outer wall 106 and a second end of the inner wall 104. The second cap 110 has a second solid portion 112 similar to the first solid portion. The second solid portion 112 is located between the outer wall 106 and the inner wall 104. Again, this second solid portion prevents any granulated active carbon filter material from escaping from the space between the outer wall and the inner wall. The second cap further includes a cylindrical flange 114 which extends from the filter parallel to the longitudinal axis. An exterior side of the inner wall defines an interior void in the filter.

Air may pass from adjacent to an exterior surface of the filter 100 through a portion of the granulated active carbon material. After passing through the granulated carbon material, the air may exit to the interior void. Alternatively, depending on the design of the intake, the air may pass from the interior void through the perforated metal housing, through the granulated active carbon filtering material, and then out through the mesh of the outer wall. This air flow path reverses that of the previous path.

This design inherently has a number of problems. The filter 100 is a consumable item. Ideally, it would be very low cost. However, the state-of-the-art filter includes several aspects which increase the costs. First, the frame itself includes several aspects which increase the cost. The mesh outer wall and inner wall are created from solid sheets which are punched to create the mesh. This uses the same amount of material as a solid sheet and adds labor. The sheet starts as a sheet, and must have the unwanted material removed to create the mesh or perforation. Then, the sheet must be formed into the generally cylindrical shape. The caps must also be formed and attached to the outer wall and inner wall. Most critically, the second cap has a flange that must be formed. Forming the flange is an expensive process which significantly increases the cost. The second cap alone may be as much as 30 to 40% of the cost of the filter.

Further, the process to add the active carbon is very labor intensive. Because the active carbon is granulated, the active carbon must be compacted to remove air gaps. If the compaction process does not provide sufficient compaction, and air can pass around and not through the activated carbon, no filtering take place. Thus, the granulated carbon must be added to the space between the outer wall 106, inner wall 104, and first cap 107 in stages. After the granulated activated carbon is first added, the entire filter 100 must be vibrated so that the granulated active carbon is compacted. After compaction, the granulated active carbon no longer occupies the entire volume of the space between the outer wall 106, inner wall 104, and first cap 107. The process of vibration and compaction must again be repeated for this next portion of granulated active carbon which is added. The process may have to be repeated several more times until there is no further compaction through vibration.

Because the compaction process causes the granulated particles to grind against one another, a great amount of carbon dust is produced during the process. This carbon dust continues to be produced every time the filter 100 is handled until the filter 100 is installed in the system. Once the filter 100 is installed, the dust may enter the HVAC system. This dust may be distributed undesirably throughout the HVAC system, and may be sent out through the vent in to the environment of the structure. The carbon dust is not fit for respiration.

For the foregoing reasons, there is a need for an active carbon air filter which has a lower cost of manufacture and does not emit carbon dust both in the manufacturing process and in use.

BRIEF SUMMARY

Disclosed is an air filter for filtering contaminants from a heating, ventilation, and cooling system. The air filter may include a shell. The shell may include one or more beads for strengthening the shell. The shell may form a solid exterior wall. The solid exterior wall may define an interior. The air filter may further include one or more o-rings. The one or more o-rings may be located in the one or more beads. The air filter may also include a honeycomb carbon filter unit made of an activated carbon material. The honeycomb carbon filter unit may be located in the interior of the shell. The honeycomb carbon filter unit may be adjacent to the one or more o-rings. The honeycomb carbon filter unit may have a wall. The wall may define an exterior surface and an interior. The honeycomb carbon filter unit may further include a honeycomb structure cross section in the interior.

Further disclosed is a method for manufacturing an air filter. The method may include forming a honeycomb carbon filter unit. The honeycomb carbon filter unit may be formed from activated carbon. The honeycomb carbon filter unit may include an exterior surface and a honeycomb cross section. The honeycomb cross section may include a plurality of channels. The plurality of channels may extend an entire length of the honeycomb carbon filter unit. The honeycomb carbon filter may include a honeycomb carbon filter unit first end and a honeycomb carbon filter unit second end. The method may include strengthening the exterior surface with a compound or structure. The method may further include attaching a shell to the exterior surface. The shell may include one or more beads or cross bends. The honeycomb carbon filter unit may include a first structure on the first end and a second structure the second end. The first structure on the first end and the second structure the second end which may cause air passing through the filter unit to move in a pre-determined pattern.

Further disclosed is an air filter for filtering contaminants from a heating, ventilation, and cooling system. The air filter may include a first filter unit section. The first filter unit section may be of an activated carbon material. The first filter section may include one or more first exterior wall sections. The first filter section may also include a first essentially planar wall section. The first essentially planar wall section may have a first essentially planar exterior surface extending between a first edge and a second edge of the one or more exterior wall sections. The first essentially planar wall section may also have a first essentially planar exterior surface. The first filter unit section may have a honeycomb structure cross section. The air filter may also have a second filter unit section. The second filter unit section may be made of an activated carbon material. The second filter section may include one or more second exterior wall sections. The second filter section may further include a second essentially planar section. The second essentially planar section may have a second essentially planar exterior surface. The second essentially planar section may further include a honeycomb cross section. The second essentially planar exterior surface of the second filter unit section may be attached to the first essentially planar exterior surface of the first filter unit section so that the first filter unit section and second filter unit section are mirrored and form a combined filter unit having a first end and a second end. The air filter may further include a metallic shell around and adjacent to the first arcuate wall portion and the second arcuate wall portion of the combined filter unit.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the presently preferred embodiment of an activated carbon air filter for use in a heating, ventilation, and air conditioning (HVAC) system, and is not intended to represent the only form in which it can be developed or utilized. The description sets forth the functions for developing and operating the system in connection with the illustrated embodiments. It is to be understood, however, that the same or equivalent functions may be accomplished by different embodiments that are also intended to be encompassed within the scope of the present disclosure. It is further understood that the use of relational terms such as first, second, distal, proximal, and the like are used solely to distinguish one from another entity without necessarily requiring or implying any actual such relationship or order between such entities.

The state-of-the-art air filter uses a metal frame filled with granulated active carbon. There are numerous issues inherent in such a design. Critically, the issues cannot be mitigated by differing manufacturing techniques. Rather, a redesign is required. The disclosed filter reorients the air flow of the state-of-the-art filter by 90 degrees. Rather than having an air path that passes air from outside to inside the filter, which is a path perpendicular to the air flow in the ducting, the disclosed filter performs the filtration with an in-line air flow. This flow provides better air handling, and increased ease of installation and maintenance.

Figure 3:
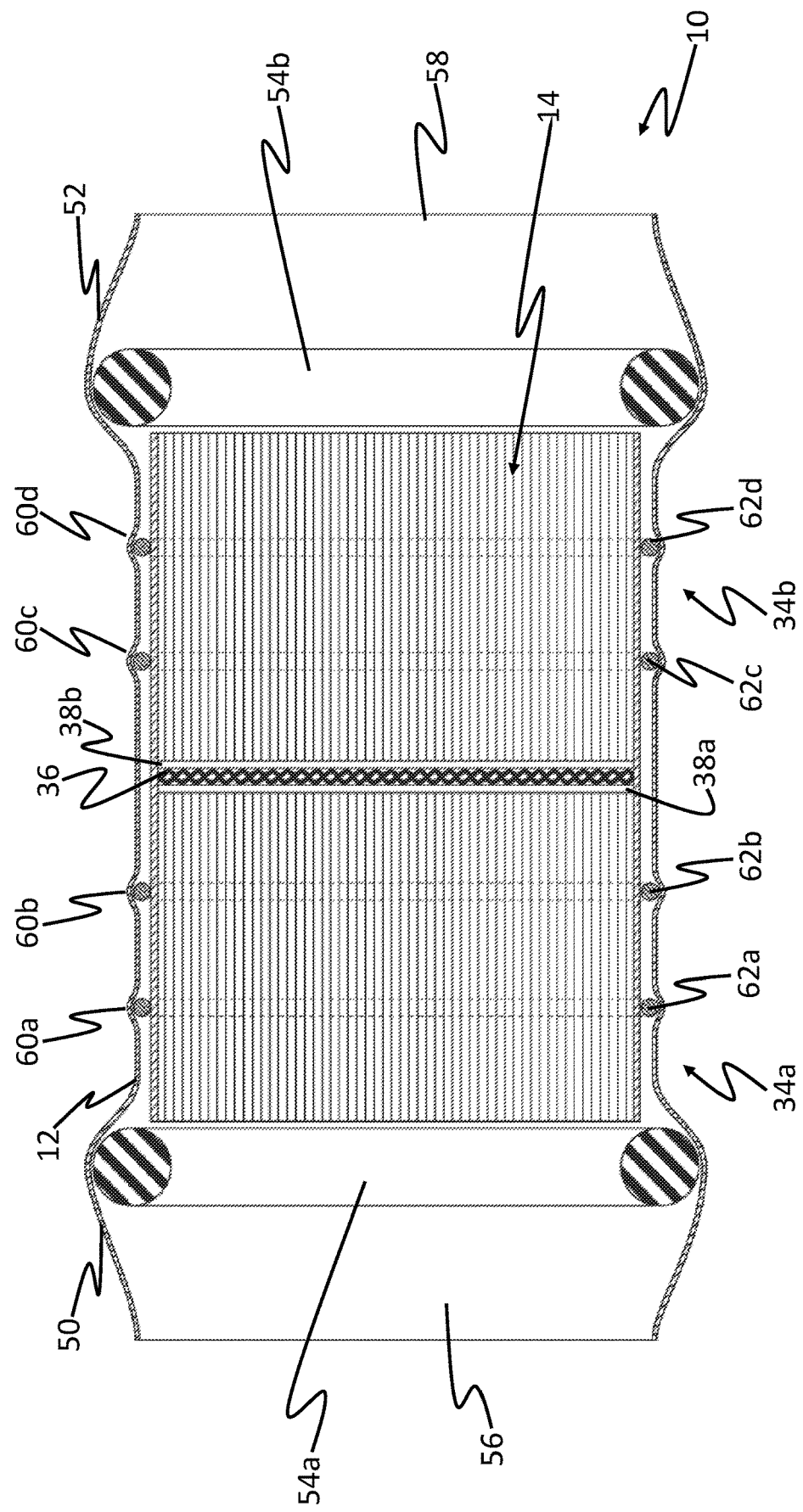
FIG. 3 shows a plan cross section view of a second embodiment of filter unit in a completed filter.

With reference to FIG. 3, the filter 10 may include an outer shell 12 and a honeycomb carbon filter unit 14 located inside the shell 12. The shell 12 may be formed from a single piece of material. The material may be a galvanized sheet metal, a non-galvanized sheet metal, a vinyl, or a polymer.

Figure 1:
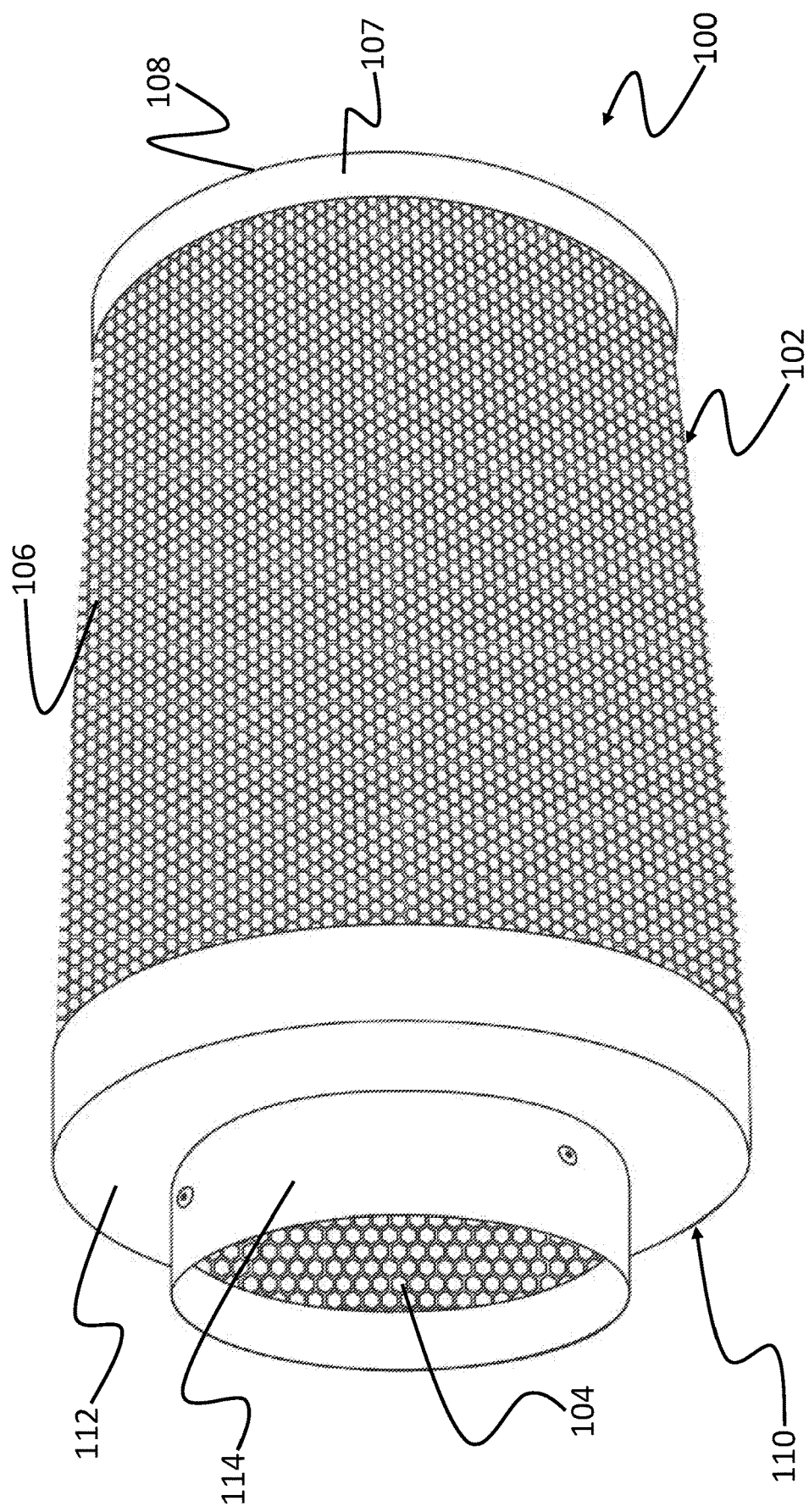
FIG. 1 shows a prior art air filter.
Figure 2:
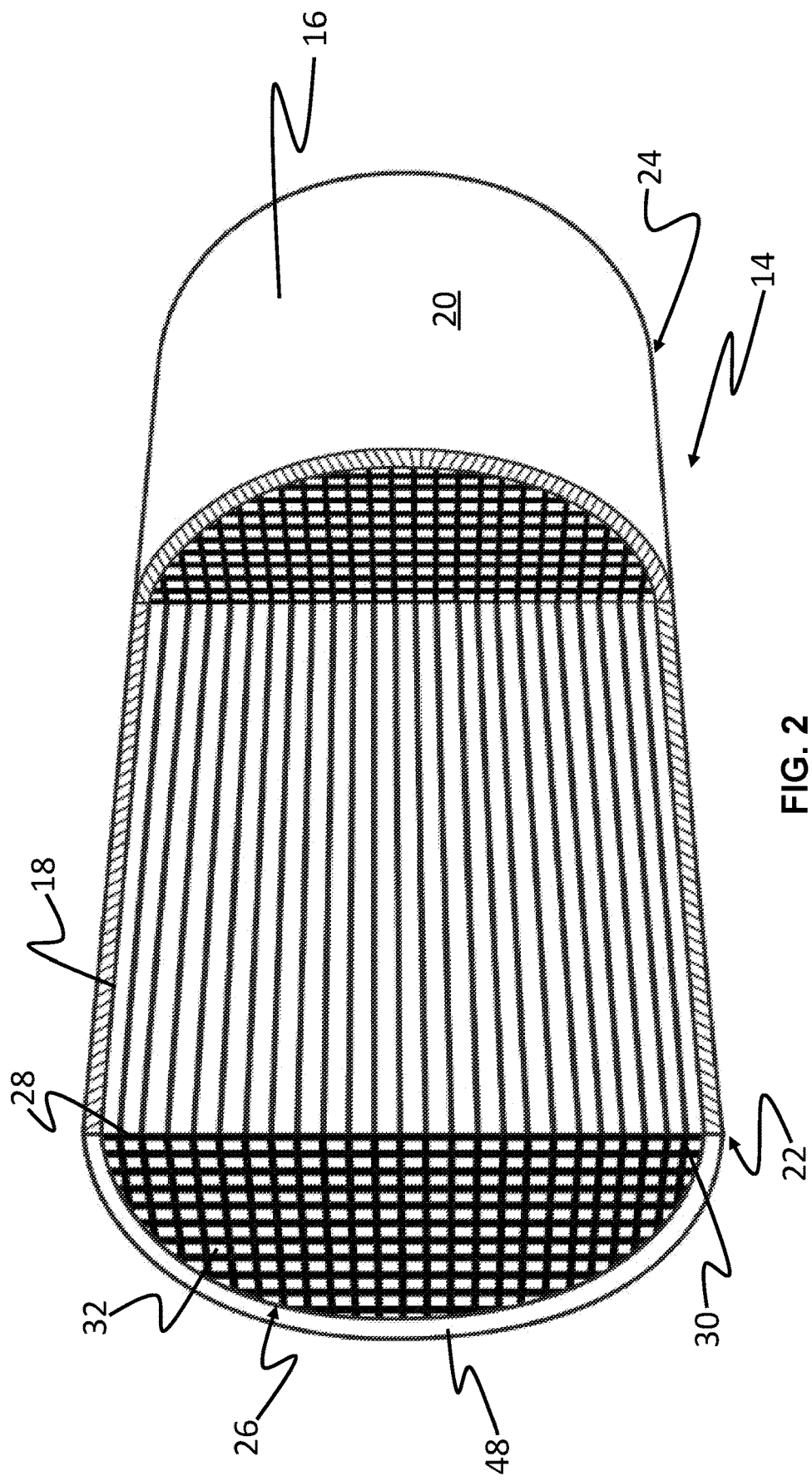
FIG. 2 shows a perspective cross section view of one embodiment of a filter unit.

With reference to FIG. 2, in one embodiment, the honeycomb carbon honeycomb carbon filter unit 14 may have a generally cylindrical shape. Alternatively, the honeycomb carbon filter unit may have a prism shape, a parallelepiped shape, or any general shape which may accommodate a honeycomb interior. The exemplary embodiment shown in FIG. 2 is not meant to be limiting. The activated carbon may be formed into a solid shape through heat and compression, either by molding or by extrusion. Alternatively, compression alone may be used. In addition, in any embodiment, a binding agent may be added to the activated carbon to add further structural integrity to the honeycomb carbon filter unit 14. The heat may activate the binding agent, or the binding agent may be activated by pressure alone. The honeycomb carbon filter unit 14 may have a solid wall 16 around a perimeter of the honeycomb carbon filter unit 14. When the honeycomb carbon filter unit 14 is generally cylindrical, the solid wall 16 may be cylindrical as well. When the honeycomb carbon filter unit 14 is another shape, the solid wall may take the shape of an exterior surface of the general shape. The solid wall 16 may have an inner surface 18 and an outer surface 20. Both the inner surface 18 and the outer surface 20 may extend from a first end 22 of the honeycomb carbon filter unit 14 to a second end 24 of the honeycomb carbon filter unit 14, the distance between the first end 22 and the second end 24 defines a length of the honeycomb carbon filter unit 14. The outer surface 20 defines an outer circumference of the honeycomb carbon filter unit 14. The inner surface 18 defines an interior circumference of the honeycomb carbon filter unit 14.

The honeycomb carbon filter unit 14 may have an interior volume. The interior volume may be defined by the inner diameter and the length. The honeycomb carbon filter unit 14 may include a honeycomb cross section 26 located in the interior volume. The honeycomb cross section 26 may include one or more vertical dividers 28 and one or more horizontal dividers 30. The vertical dividers 28 and the horizontal dividers 30 may each have a first end which starts at a location on the inner surface and extends to a location opposite the first end on the inner surface 18, each of the one or more vertical dividers 28 and each of the one or more horizontal divers 30 defining a chord on the inner circumference. All of the vertical dividers 28 may be substantially parallel to one another. All of the horizontal dividers 30 may be substantially parallel to one another. Each of the vertical dividers 28 may be substantially perpendicular to each of the horizontal dividers 30, and vice versa. The vertical dividers 28 may or may not be oriented vertically when the filter 10 is installed. Moreover, the horizontal divers 28 may or may not be oriented horizontally when the filter 10 is installed. The terms "vertical" and "horizontal" are merely to orient the structure of the filter 10 for understanding of the disclosure and are not meant to be limiting.

Each of the vertical dividers 28 and the horizontal dividers 30 may extend between the first end 22 of the honeycomb carbon filter unit 14 and the second end 24 of the honeycomb carbon filter unit 14, thus having a length substantially equivalent to that of the honeycomb carbon filter unit 14. The combination of the one or more vertical dividers 28 and one or more horizontal dividers 30 may define a plurality of through channels 32. The channels 32 may have a square cross section, or a round cross section, or an oval cross section, or any shape which allows for the passage of air, and depending on the form of the mold in which the honeycomb carbon filter unit 14 is formed. The manufacturing process of the honeycomb carbon filter unit 14 is discussed in detail below.

Alternatively, the filter unit may not have dividers that define chords. Rather, the channels may be, for example, hexagons, the sides of which are angled relative to one another. Because of this, no single divider extending in a straight line is present. Instead, the divider portions around and between the channels may include portions angling in different directions. A similar structure may be accomplished using octagon shaped channels. Thus, the dividers in such embodiments are shared walls which define the hexagon or octagon shapes. Shapes other than hexagons and octagons are also contemplated. Any honeycomb pattern may be combined with any general exterior shape.

The honeycomb carbon filter unit 14 may be formed using a mold. The process may start by obtaining the carbon in a powder form. Alternatively, the carbon may be obtained in another form and worked into a powder form. When the honeycomb carbon filter unit 14 has a substantially cylindrical shape, the mold may have a substantially cylindrical wall. It is understood that when the honeycomb carbon filter unit 14 has an alternative shape, the mold will include a correspondingly shaped wall. The interior of the cylindrical wall may have a diameter equal to that of an outer diameter of the honeycomb carbon filter unit 14 to be formed by the mold. Thus, the mold may have a circular cross section. The cylindrical wall may further have a first end, and an opposite, second end. The mold may have a length greater than that of the finished honeycomb carbon filter unit 14. An interior surface of the cylindrical wall may define an interior void of the mold into which the activated carbon powder is placed to form the honeycomb carbon filter unit 14.

The interior void of the mold may have several mold rods extending therethrough. The second end of the mold may have a cap which closes the second end of the cylindrical wall. A number of mold rods may be attached to, and extend from, the cap. The rods may be attached to the cap at a second end of each of the mold rods. Each of the mold rods may be attached by welding or adhesives or any method which will permanently attach each mold rod to the cap. Permanent attachment means that the mold rods may only be removed by damaging the connection between the mold rod and the cap, and consequently, causing damage to either the mold rod, the cap, or both in damaging the connection. The mold rods may share a common cross section. For example, the mold rods may each have a square cross section, a round cross section, an oval cross section, a hexagonal cross section, or an octagonal cross section, or any other cross section which will achieve the desired honeycomb pattern in the interior void of the honeycomb carbon filter unit 14. The mold rods may extend from the cap through the interior void to the first end of the mold. Thus, the mold rods may have the same length as the mold itself. Alternatively, a portion of the mold rods may have a first cross section, and another portion a second cross section. Still further alternatively, the mold rods may have more than two cross sections.

To manufacture the honeycomb carbon filter unit 14, the mold may be first filled with activated carbon powder. The activated carbon powder may include a binding agent already mixed in. Alternatively, a binding agent may be added to the mold separately. After the addition of the activated carbon and binding agent, if one is being used, a piston may be placed the in the first end of the mold. The piston may be generally disc shaped to correspond to an interior void of the mold. The piston may include a disc body including apertures to accommodate the mold rods, as the piston moves within the mold. The piston may further have longitudinal extensions on a proximal end to allow the piston to extend into the mold. The piston may have extensions or forms on the distal end to form structures on one end of the filter unit or filter section which predetermine the path of air into the honeycomb on the interior of a filter unit. Either by hand, or using machine power, the piston may be inserted in the mold to compress the granulated activated carbon. The piston may compress the granulated activated carbon to a specified density. Heat may be added to the mold to aid in activating the binding agent when a binding agent is used in addition to the activated carbon.

Both the mold and the piston may be shaped so that both the first end and the second end of the honeycomb carbon filter unit 14 may have some structure which causes the air to move in a pre-determined pattern as the air first enters the honeycomb carbon filter unit 14. Of course, once the air molecules come in contact with the honeycomb cross section, the air molecules will cease moving according to the pre-determined pattern. The breaking of the pre-determined pattern is of no concern, however. This is because the structure which causes the air to move in the predetermined pattern is included with the filter unit to ensure that as much air as possible comes in contact with the honeycomb carbon filter unit 14, as opposed to passing through without making contact. For example, the first and second ends of the filter unit may be molded with a structure 48 so that the air moves in a vortex pattern.

The mold may be designed to produce one section of a multi-section honeycomb carbon filter unit 14. As shown in FIG. 3, in some embodiments, the section may be a portion of the length of the honeycomb carbon filter unit 14, but the entirety of the cross section. This type of sections may be referred to as a series section, because the filter unit is assembled by attaching a plurality of these sections 34a, 34b in line or series. The section length may be one half of the overall length of the honeycomb carbon filter unit 14. Section lengths of less than one half of the filter unit length are also contemplated. After each of the sections 34a, 34b is formed, the sections may be assembled end to end to form the honeycomb carbon filter unit 14. In addition, an activated carbon material 36 may be placed at the joints of the sections. The material 36 may be a hog hair mat cut to match the cross section of the honeycomb carbon filter unit 14. The piston may include a lip mold around the circumference which forms an area 38a, 38b in the interior void into which the material 36 may be placed so that the material 36 is not overly compressed when the sections 34a, 34b and material 36 are assembled, and so that the sections 34a, 34b may have sufficient surface available for attaching to one another. The ends of the sections 34a, 34b may be butted together and an adhesive applied to the surfaces of the filter sections to attach the sections 34a, 34b. When series filter sections are molded, the piston may be configured to mold one end of the filter section to a shape which causes air, when passing through the shape, to move in a predetermined pattern. Thus, when two identical sections are assembled, they may be assembled so that the shape is present at both the first end and the second end of the assembled honeycomb carbon filter unit 14.

Figure 4:
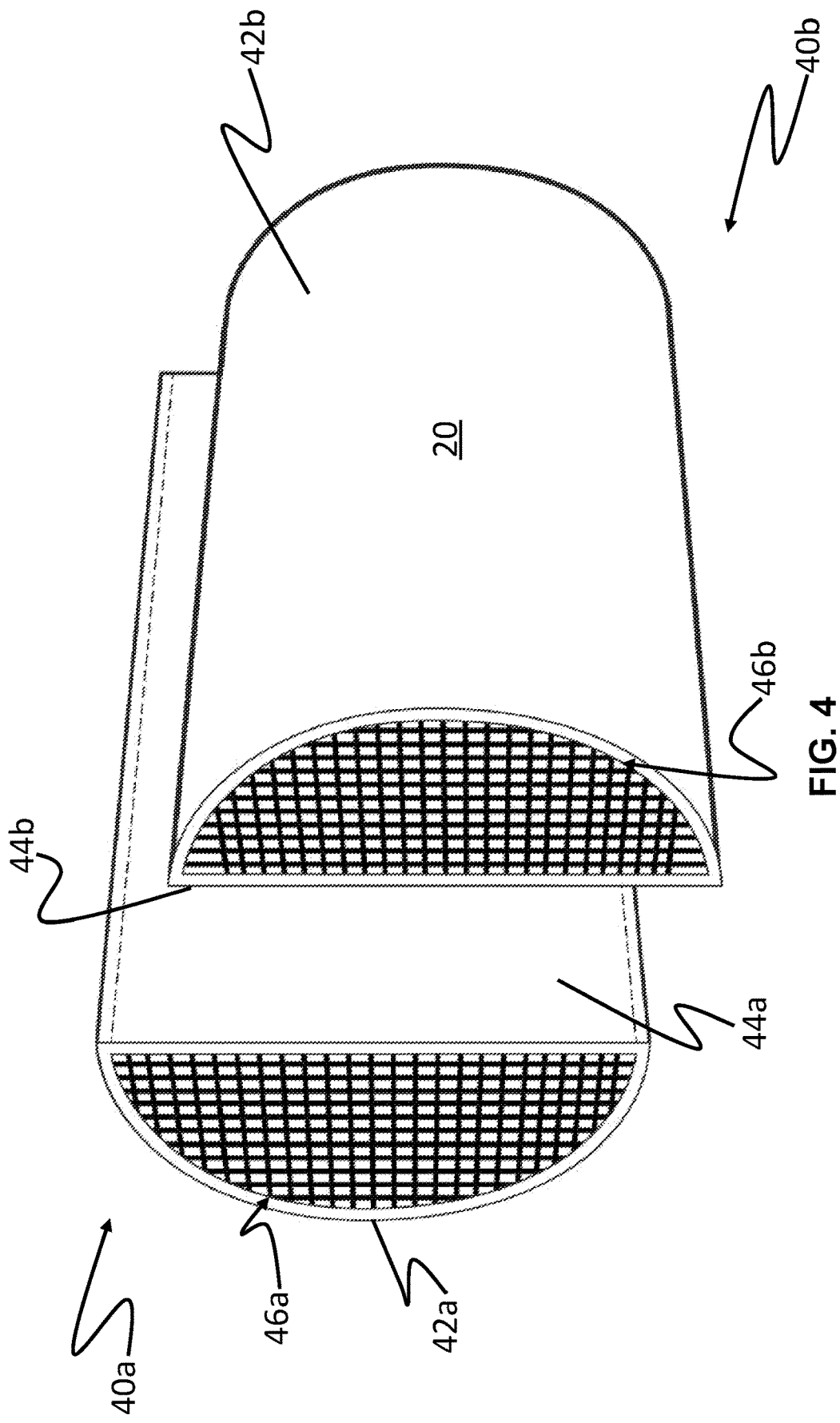
FIG. 4 shows a perspective view of a third embodiment of a filter unit.

As shown in FIG. 4, in other embodiments, the mold may be designed to form sections 40a, 40b which are the full length of the honeycomb carbon filter unit 14, but are a portion of the cross section of the honeycomb carbon filter unit 14. This type of filter section 40a, 40b may be termed a parallel filter section. Parallel filter sections may be assembled side by side to form a complete filter unit. For example, the mold may form a substantially semi-cylindrical filter unit section. As shown in FIG. 4, when the semi-cylindrical sections 40a, 40b are formed in the mold, the sections may have one arcuate wall section 42a, 42b, and one planar wall section 44a, 44b. The planar wall and arcuate wall sections may join at their respective edges along the length of both portions. The joining of the walls forms a semi-cylindrical cross section. Of course, the two wall sections are not formed separately. Each of the sections is formed of a unitary piece of material. Further, in embodiments where the honeycomb carbon filter unit 14 is formed in a single piece rather than at least two sections, the honeycomb carbon filter unit 14 is also formed of a single, unitary piece of material. Thus, when the molding process is complete, two semi-cylinders may be assembled by attaching them along their length planar wall section 44a to planar wall section 44b to form a complete substantially cylindrical honeycomb carbon filter unit 14. The sections 40a, 40b may be joined using an adhesive on each of the planar walls 44a, 44b. Like other embodiments, the sections 40a, 40b may have a honeycomb interior 46a, 46b formed the same way the other embodiments were formed.

The honeycomb carbon filter unit 14 may also be manufactured using an extrusion process. The activated carbon material may be loaded into the extrusion devices, and either the shape of FIG. 2 or the shape of FIG. 4 may be extruded. In the case of both the shapes of FIGS. 2 and 4, filter units 14 or filter unit sections 40a, 40b respectively, may be cut to length. The filter unit sections 40a, 40b may be assembled as described above. The activated carbon material is forced through a die which forms the desired cross section. As discussed above, the extruded filter unit or filter unit section may then have a polymer material applied to the exterior surface. As also described above, the same may be added to both the first end surface and the second end surface once the filter unit or filter unit section is cut to length.

Figure 5:
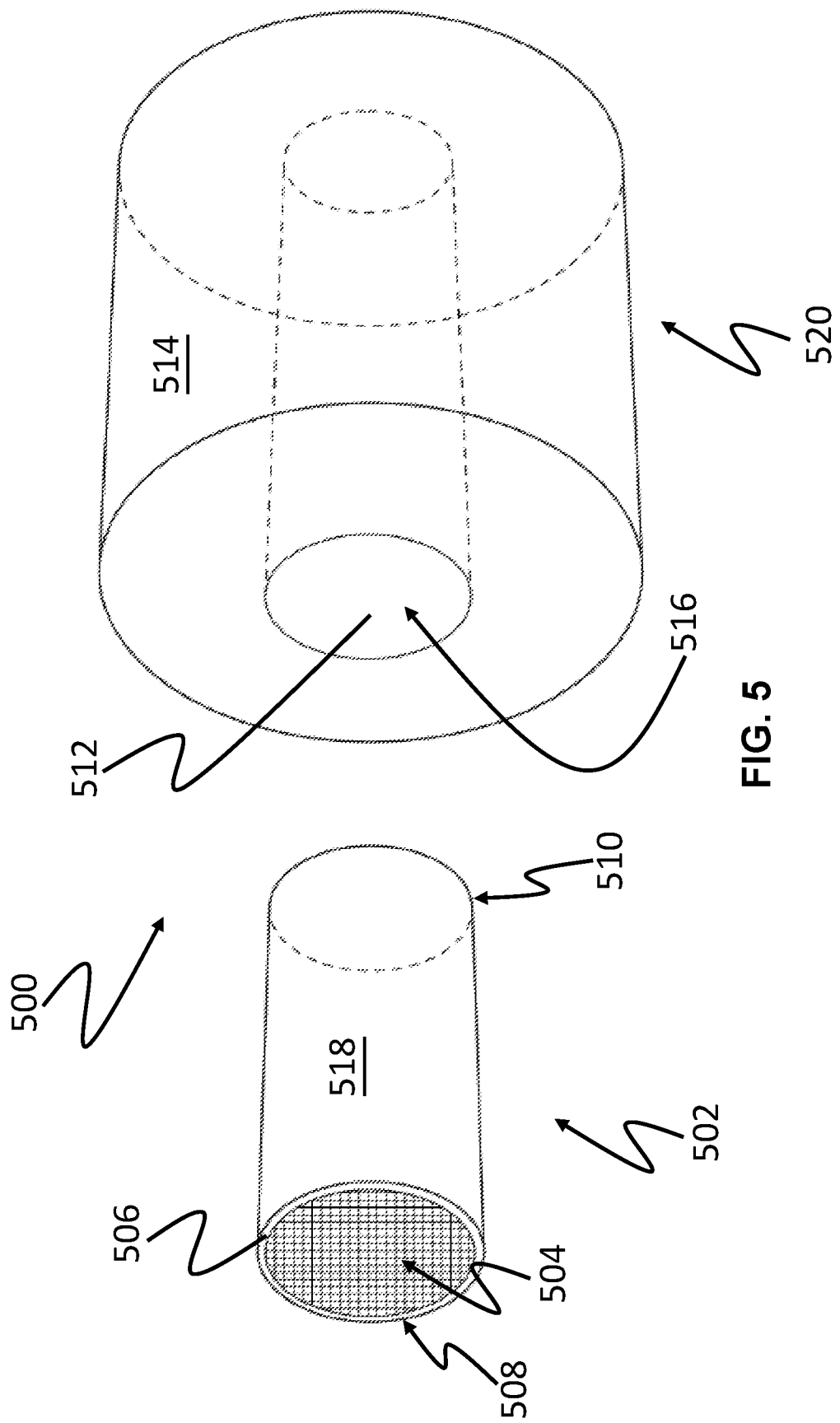
FIG. 5 shows a perspective view of a fourth embodiment of a filter unit.

As shown in FIG. 5, a filter unit embodiment similar to that of FIG. 2 may also be used in a fourth embodiment. As shown in FIG. 5, a honeycomb carbon filter unit 502 similar to that of FIG. 2 may be a first section 502 of another embodiment of honeycomb carbon filter unit. The first section 502 may be placed inside a second section 520 which acts as a sleeve for the first section 502. This configuration may allow the filter 500 to fit larger HVAC ducting. The fourth embodiment uses two concentric filter sections 502, 520 to form the honeycomb carbon filter unit 500. The first filter section 502 may be a honeycomb carbon filter unit similar to that of FIG. 2. That is, it may be an extruded or molded substantially cylindrical filter unit with a honeycomb cross section. Alternatively, again similar to the honeycomb carbon filter unit 14 of FIG. 2, the filter unit may be substantially prism shaped, parallelepiped shaped, or any other shape which will accommodate the honeycomb structure cross section 504 in the interior. Although the example of FIG. 5 uses cylinders, it is understood that any other shape either specified above or obvious to one of ordinary skill in the art could be used as well. The solid wall 506 of the first filter section may be shaped so that it has a taper from the first end 510 to the second end 508 in the range of 2 to 10 mm. That is, the first end 510 may have a diameter 2 to 10 mm less than a diameter of the second end 508 or vice versa. The second filter section 520 may be a sleeve for the first filter section 502. The second filter section 520 may also be substantially cylindrical and may have an interior cylindrical surface 512 and exterior cylindrical surface 514. The interior cylindrical surface 512 may be concave, and define a cylindrical void 516, while the exterior cylindrical surface 514 may be convex. The cylindrical void 516 may be sized and shaped so that the first filter section 502 may be placed in the cylindrical void 516 and the exterior surface 518 of the first filter section 502 may form a friction fit with the interior cylindrical surface 512. An adhesive may also be used to attach the first filter section 502 to the second filter section 520. The distance between the exterior cylindrical surface 514 and the interior cylindrical surface 512 may be varied to fit corresponding HVAC ducting sizes. For example, if the largest diameter first filter section 502 which an extrusion device may produce is 8 inches, and the ducting of the HVAC system is 12 inches, a second filter section 520 with a distance of slightly less than 4 inches between the exterior cylindrical surface 514 and the interior cylindrical surface 512 may be formed. For example, the distance may be 3¹³⁄₁₆ inches. This will allow for the shell 12 (not shown) to be placed on the exterior surface 514 and for some taper on the end portions in order to form a friction fit between the shell and the HVAC ducting.

Once any sections of the filter are assembled, a thermoset polymer compound may be added to the exterior surface 20 of the honeycomb carbon filter unit 14 to add structural integrity during handling and further assembly. The thermoset polymer may be, for example, an epoxy, polyester resin, a vinylester, or a thermoplastic. The thermoset polymer may be sprayed on to the exterior surface 20 of the honeycomb carbon filter unit 14. Alternatively, the thermoset polymer may be applied using a dip coating, a brush, or the honeycomb carbon filter unit 14 may even be rolled against an application head to apply the thermoset polymer. The thermoset polymer may further contain an adhesive compound which makes attaching the honeycomb carbon filter unit 14 to the shell 12 easier by preventing the honeycomb carbon filter unit 14 from moving relative to the shell 12 during assembly. Alternatively, any liquified or solid material may be added to the exterior surface 20 of the honeycomb carbon filter unit 14 to add strength to the honeycomb carbon filter unit 14 during handling of the honeycomb carbon filter unit 14 for assembly. The thermoset polymer may also be added to the surface, which may also be called a face, of the first end and the surface, which may also be called a face, of the second end of the filter unit. Liquid compounds are preferred because of their generally lower cost and less intensive labor in assembly.

The thermoset polymer may also include one or more of various fiber materials to add strength to the honeycomb carbon filter unit 14. The fiber material may be mixed in with the thermoset polymer to aid in ease of application. The thermoset polymer may then be applied in a predetermined orientation. In certain orientations, the fiber material adds as much strength as possible to the honeycomb carbon filter unit. Alternatively, the fiber material may be applied separately from the thermoset polymer. Still further alternatively, the fiber material may be applied alone.

As another alternative, a heat shrink wrap may be applied to the exterior surface of the honeycomb carbon filter unit. Heat shrink tubing is commonly sold in various sizes. The heat shrink tubing may be placed around the exterior surface of the honeycomb carbon filter unit and then heat applied to the heat shrink tubing to form a skin around the exterior surface of the honeycomb carbon filter unit. The tubing will not cover the faces of the honeycomb carbon filter unit. This is inherent in the shape of the tubing. Thus, the thermoset polymer may be applied to the first end and the second end. Alternatively, a fiber material may be applied to the first end and second end of the honeycomb carbon filter unit. Still further alternatively, the first end and the second end of the honeycomb carbon filter unit may be left untreated.

The shell 12 and honeycomb carbon filter unit 14 may be assembled to form the finished filter 10. The shell 12 may be formed from a sheet of material commonly used for ducting cut to size for forming the shell 12. In addition to having sufficient length to cover the honeycomb carbon filter unit 14, the sheet for forming into the shell may have additional length. The additional length may account for some length lost in adding features to the sheet in order to add greater strength to the shell 12. Alternatively, or in addition, the sheet to be formed in the shell may have additional length for forming a flange which may be used in attaching the filter 10 to the HVAC system ducting to which the filter 10 is to be attached.

The sheet to be formed into the shell 12 may have some fabrication work done to it before the shell 12 and honeycomb carbon filter unit 14 are joined. For example, the sheet may have one or more cross breaks formed in the sheet. The sheet may be bent on a bending machine to form some cross breaks. Alternatively, the sheet may be rolled in certain locations to form beads 50, 52 to add strength to the sheet and prevent the sheet from buckling under loads. The beads may be of more than one size, and may have more than one shoulder configuration. Using either method, or both methods in combination, the sheet may be strengthened by the addition of cross breaks or beads, or both.

Forming beads 50, 52 in the sheet may have other uses beyond strengthening the sheet. For example, in embodiments where there is no adhesive added to the liquid polymer coating on the exterior surface of the honeycomb carbon filter unit 14, a first bead 50 may be located adjacent to the first end of the honeycomb carbon filter unit 14, and a second bead 52 may be located adjacent to a second end of the honeycomb carbon filter unit 14. An o-ring 54*a*, 54*b* may be placed in each of the beads to lock the honeycomb carbon filter unit 14 within the shell. Thus, in addition to strengthening the shell 12, the bead 50, 52 may serve as a channel for containing a device for holding the honeycomb carbon filter unit 14 in a predetermined location. The o-ring 54*a*, 54*b* may be made of a rubber or polymer material. The o-ring may be solid or hollow. Alternatively, the o-rings and an adhesive may be used in combination to keep the honeycomb carbon filter unit 14 from moving relative to the shell 12.

Additional beads 60*a*-*d* may be formed in the shell 12. For example, beads 60*a*-*d* may be formed along the portion of the shell 12 housing the honeycomb carbon filter unit 14. These beads 60*a*-*d* may also be used to position o-rings 62*a*-*d*. However, the o-rings 62*a*-*d* in these beads may perform a different function. In some embodiments, the shell 12 may be formed first, and then the shell 12 and the honeycomb carbon filter unit 14 joined. When this method of assembly is used, the honeycomb carbon filter unit 14 may not abut the shell 12 around the entire exterior circumference of the honeycomb carbon filter unit 14. O-rings 62*a*-*d* may be placed in the beads 60*a*-*d* to serve one or more purposes. For example, the o-rings 62*a*-*d* may provide a better fit between the honeycomb carbon filter unit 14 and the shell 12. Additionally, the o-rings 62*a*-*d* may be used to form a seal between the honeycomb carbon filter unit 14 and the shell 12. The seal will prevent any air from escaping the filter 10 between the honeycomb carbon filter unit 14 and the shell 12. Although four addition o-rings and beads are shown in FIG. 3, fewer than four beads and o-rings may be used.

The shell 12 may include additional length past the first end of the honeycomb carbon filter unit 14, and past the second end of the honeycomb carbon filter unit 14 for attaching the shell to other ducting. The end portions 56, 58 of the sheet to be formed in to the shell may be worked before the shell is formed. The working may include forming a flange for connecting the filter to the ductwork of an HVAC system. The working may include additional cross breaks or beads to strengthen the flanges, as they are likely to be both axially loading and loading perpendicular to the longitudinal axis of the honeycomb carbon filter unit 14. The latter loading may induce shear forces or forces that cause bending, while the axial loading may cause buckling in the flange or the other portions of the shell. The cross breaks or beading or the combination of cross breaks and beading strengthen the flange and may prevent the forces from being applied to other areas of the shell.

The flange may be further worked to form a series of alternating ridges along opposing end portions of the sheet. The end portions will form the flange when the sheet is rolled to form the shell 12, as is discussed in further detail below. A series of alternating ridges may be formed along the opposing ends of the sheet. The formation of these alternating ridges may also be referred to as crimping. This working of the end portions, from the edge of the sheet or shell to some distance back from the edge effectively shortens the width of the end portions by causing the same amount of material to travel a longer distance. Because the same amount of material cannot cover the same amount of distance without being stretched thinner, the forming of the alternating ridges causes the end portion to be shorter. Because of the formation of the ridges, the end portions will curve or arc across the width of the sheet. When the sheet is rolled to form the shell 12, these end portions with have a smaller diameter than the remainder of the shell.

The shoulder configuration of the beads 50, 52 adjacent to the first end and second end of the honeycomb carbon filter unit 14 on the shell may also provide a function in fitting the filter 10 to an HVAC system's ducting. The beads 50, 52 may be formed with shallow shoulders in order to provide a range of dimensions to obtain a friction fit. For example, a first type of HVAC ducting may be 250 mm, and a second type of HVAC ducting may be 10 inches, which is approximately 254 mm. The shallow shoulder of beads 50, 52 creates a gentle slope to the edge of the shell 12. At the edge the diameter is less than 250 mm. The diameter gradually increases along a length of the shell. The increasing diameter allows for a friction fit of the filter 10 to a range of HVAC ducting sizes, including 250 mm and 10 inches or 254 mm.

Alternatively, if a bead is formed, the bead may be formed with a shorter length one side than the other in order to form an end portion of the length of the shell 12 with an unequal circumference as compared to other portions of the length of the shell 12. For example, the opposing end portions of the shell 12 may have a diameter greater than a middle portion of the length of the shell 12 as apportioned by the addition of two beads across the sheet at a distance apart substantially equal to the length of the honeycomb carbon filter unit 14. The portion of the sheet between the two beads may be the middle portion, and the portions between a bead and an edge of the sheet may form a first end portion and a second end portion. When the shell 12 is formed with the opposing end portions having a greater circumference than the remainder of the shell 12, the opposing end portion may be connected to the HVAC ducting in a different manner than when the opposing end portions have a smaller circumference than the remainder of the shell 12.

To form the filter 10, the honeycomb carbon filter unit 14 may be placed on the sheet in a predetermined location. For example, if two beads 50, 52 have been formed in the sheet to strengthen the sheet, and correspondingly, the shell 12, or to act as a retention groove for an o-ring 54a, 54b, or both, the honeycomb carbon filter unit 14 may be placed between the beads 50, 52. The first bead 50 may be adjacent to the first end of the honeycomb carbon filter unit 14, and the second bead 52 may be adjacent to the second end of the honeycomb carbon filter unit 14. If an adhesive has been applied to the honeycomb carbon filter unit 14, then the honeycomb carbon filter unit 14 may be placed on a generally flat sheet. The generally flat sheet may have some curvature at the opposing end portions if the series of alternating ridges has been formed there. Alternatively, the sheet may be curved so that the filter settles to the apex of the curve. This configuration helps ensure that the honeycomb carbon filter unit 14 does not move as the shell 12 is formed. Alternatively, the adhesive may be applied to the sheet, and the honeycomb carbon filter unit 14 placed on the sheet in the location of at least some of the adhesive.

The sheet may then be rolled around the exterior surface of the honeycomb carbon filter unit 14 to form the shell 12. After the rolling, the sheet may have material which extends beyond the first end and the second end of the honeycomb carbon filter unit 14. The sheet may also have material which is excess and would overlap as the sheet is rolled around the exterior circumference of the honeycomb carbon filter unit 14. This excess material may be used to form a closed seam. One edge portion may be folded over the opposing edge, and then the entire excess folded as flat as possible to the exterior surface of the shell 12. Forming such a seam prevents the shell 12 from unrolling.

If one or more series of alternating ridges were formed in the opposing end portions of the sheet, then the circumference of those end portions may be less than the interior circumference of the ducting to which the filter 10 is to connect. Thus, the reduced circumference of the opposing end portions allows the opposing end portions of the filter 10 to be inserted in the interior of the ducting of an HVAC system, and will provide a friction fit between the end portions and the ducting of the HVAC system. In addition, duct tape may be used to ensure the connection between the filter 10 and the HVAC system ducting, and prevent any later movement of the filter 10 relative to the HVAC system ducting. Alternatively, if the end portions of the filter have a greater diameter than the ducting to which the filter 10 is to be connected, the shell 12 may have a friction fit with the exterior surface of the ducting. Again, duct tape may be used to ensure a good fit, and to make certain that the filter 10 does not move relative to the HVAC ducting.

Returning to the installation of the shell 12, once the seam is formed, then the shell 12, and correspondingly, the filter 10, is complete. As will be readily understood by one of ordinary skill in the art, the disclosed filter configuration has far fewer parts than state-of-the-art filters. The disclosed filter 10 has greater ease of manufacture, and produces far less carbon dust in manufacture, because the granulated activated carbon is not repeatedly compacted, generating carbon dust with each compaction. Further, any compaction takes place in the interior of the mold, which contains the dust, and the mold may be cleaned from time to time to prevent build up and escape of the dust. Thus, the filter 10 will also almost certainly produce less carbon dust in operation, as well.

In operation, the filter 10 may be placed in line with the air flow in an HVAC ducting system. Depending on the structure of the opposing end portions of the shell 12, the opposing end portions may be placed either in an interior of the HVAC ducting to which the filter 10 is being connected, or may be placed around an exterior of the HVAC ducting to which the filter 10 is being connected. Duct tape may be used in either embodiment to seal the connection between the filter 10 and the HVAC ducting at each of the connection points on opposing ends of the filter 10.

Once placed in the ducting system, the filter 10 will passively filter the air flowing through the filter 10. Air in the HVAC ducting will flow until the air encounters the honeycomb carbon filter unit 14. A portion of the air molecules will contact the honeycomb carbon filter unit 14 and the honeycomb carbon filter unit 14 will perform its filtering function. Other portions of the air will enter the honeycomb portion of the honeycomb carbon filter unit 14 without contacting the honeycomb carbon filter unit 14 at the first end.

Air molecules may flow through the honeycomb portion of the honeycomb carbon filter unit 14 until the air molecules contact the activated carbon of the honeycomb. There is some possibility that, due to the configuration of the honeycomb, some air molecules pass through the honeycomb portion of the honeycomb carbon filter unit 14 without contacting the activated carbon. Obviously, for those molecules that do not contact the honeycomb carbon filter unit 14, there is no filtering effect. Thus, while embodiments without any other honeycomb carbon filter unit 14 parts are less expensive, they may offer less effectiveness in operation.

One design choice to increase the number of air molecules that contact the filter 10, and are thus filtered by the activated carbon, is to increase the length of the honeycomb carbon filter unit. The longer the honeycomb carbon filter unit is, the greater the probability that even minor turbulence will cause air molecules to contact at least some portion of the honeycomb carbon filter unit. Additionally, the channels within the honeycomb may have smaller dimensions, which further increases the likelihood that air molecules will contract the filter. Of course, either of the design choices of lengthening the honeycomb carbon filter unit or the smaller dimension of the channels may be used independently, or in combination.

Further, two of the embodiments discussed above offer additional solutions to, or, at least, substantial mitigation of, this potential problem. First, as discussed above, some embodiments have a piece of carbon material permeable to air stretched across the cross section of the honeycomb carbon filter unit 14. This piece of carbon material serves not just to filter the air molecules passing through it, but also to disrupt the flow of the air molecules through the honeycomb portion of the honeycomb carbon filter unit 14. By disrupting the air flow, the likelihood that air molecules pass through without contacting the activated carbon, and therefore being filtered thereby, is greatly reduced. At a minimum, air molecules will have to flow through the permeable activated carbon material in the cross section, and the material performs some filtering by itself. The material placed across the cross section of the honeycomb carbon filter unit 14 prevents laminar airflow, so the efficiency of air movement in the system is reduced. However, this is not a consideration for exhaust filtration. Additionally, the disruption of laminar flow is intentional, as it will cause air molecules to divert their path and contact the activated carbon material of the honeycomb. Further, the reorientation of the airflow discussed above more than compensates for any introduced inefficiency, and any of the embodiments of the disclosed filter 10 off more efficient air flow. Ultimately, the disclosed air filter reduces the fan power required by the system, which saves energy while producing superior filtration as compared to state-of-the-art filters.

Secondly, the end portions of the honeycomb carbon filter unit 14 may be shaped to provide some disruption effect. For example, the end portions of the honeycomb carbon filter unit 14 may be shaped so as to create a Venturi effect for the incoming air. Because the air spirals with a Venturi effect, the air will be more likely to move into a vertical divider 20 or a horizontal divider 22 or any part of the honeycomb cross section. The first end portion and the second end portion may be symmetrical, so if the filter is reversed to make most efficient use of the activated carbon material, the disruption effect is the same.

The filter 10 will continue to provide filtration while there is still non-inundated activated carbon. State-of-the-art filters inherently have certain flow paths which allow easier air flow than other potential air flow paths through the filter. Because the material in the honeycomb carbon filter unit 14 disclosed herein is much more uniform in structure that the granulated material in state-of-the-art filters, virtually all flow paths are fungible. Because virtually all flow paths are fungible, air passes more evenly over the filtering material. Thus, there is more efficient use of the filter material, and the disclosed filter provides better value for the money than state-of-the-art filters due to less of the activated carbon material being wasted. The material placed across the cross section or the shaped end portions of the honeycomb carbon filter unit 14 drive this more efficient usage by disrupting the laminar flow and randomizing it.

Moreover, because the filter is uniform, it may be reversed and reinstalled during its life cycle to promote even more efficient use. It may be that the portion of the honeycomb carbon filter unit 14 upstream in the air flow may see more absorption of contaminants than the portion of the filter unit downstream. If such uneven wear is occurring, the symmetry of the filter 10 will allow for correction. In order for the activated carbon in the filter to wear evenly, the filter may be uninstalled, reversed so that the previously downstream portion is now upstream, and reinstalled. The filter will wear more evenly and efficiently, and consequently, provide better value.

When the filter is no longer providing sufficient filtration due to absorption of contaminants from the air, the entire filter may be removed and replaced with a new filter. Even the process of removing and replacing the filter is less costly than that of the state-of-the-art filters because there is no need to access the interior of any ducting or other HVAC spaces. Rather, because the filter 10 is designed to operate in line, the filter 10 is simply removed from the system, and a new one set in its place without having to access any interiors.

The filter disclosed herein offer further advantages over state-of-the-art filters because of the disclosed filter's reduced size. Shipping costs are based on both size and weight. With both size and weight being reduced from the state-of-the-art filter in this above disclosed filter, the overall cost of the filter is lowered. With the state-of-the-art filter transportation is a significant portion of the total cost. In addition to the design advantages already disclosed herein, the cost of transportation is also reduced.

The above description is given by way of example, and not limitation. Given the above disclosure, one skilled in the art could devise variations that are within the scope and spirit of the invention disclosed herein, including various ways of forming the structure which causes the air to flow in a predetermined pattern. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An air filter for filtering contaminants from a heating, ventilation, and cooling system, comprising:
    a first filter unit section of an activated carbon material, the first filter unit section including one or more first exterior wall sections, a first essentially planar wall section having a first essentially planar exterior surface extending between a first edge and a second edge of the one or more first exterior wall sections, and the first filter unit section having a honeycomb structure cross section;
    a second filter unit section of an activated carbon material, the second filter unit section including one or more second exterior wall sections, a second essentially planar wall section having a second essentially planar exterior surface, and a honeycomb structure cross section, the second essentially planar exterior surface of the second filter unit section being attached to the first essentially planar exterior surface of the first filter unit section so that the first filter unit section and the second filter unit section are mirrored and form a combined filter unit having a first end and a second end; and
    a metallic shell around and adjacent to the one or more first exterior wall sections and the one or more second exterior wall sections of the combined filter unit.

2. The air filter of claim 1, wherein the shell has one or more beads around a circumference of the shell.

3. The air filter of claim 1, wherein the shell has a first bead and a second bead.

4. The air filter of claim 3, wherein the first bead is adjacent to the first end of the combined filter unit, and the second bead is adjacent to the second end of the combined filter unit.

5. The air filter of claim 4, wherein an o-ring is placed in each of the first bead and second bead.

6. The air filter of claim 1, wherein the combined filter unit has a thermoset polymer on the one or more first exterior wall sections and the one or more second exterior wall sections.

7. The air filter of claim 1, wherein the combined filter unit has a fiber compound on the one or more first exterior wall sections and the one or more second exterior wall sections.

8. The air filter of claim 1, wherein the combined filter unit has heat shrink tubing covering the one or more first exterior wall sections and the one or more second exterior wall sections.

\* \* \* \* \*